United States Patent
Jang et al.

(10) Patent No.: US 9,530,380 B2
(45) Date of Patent: Dec. 27, 2016

(54) DISPLAY DEVICE AND DRIVING METHOD THEREOF

(71) Applicant: Samsung Display Co., Ltd., Yongin, Gyeonggi-do (KR)

(72) Inventors: Dae-Gwang Jang, Yongin (KR); Hyun Sik Hwang, Yongin (KR); Gi Geun Kim, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 343 days.

(21) Appl. No.: 14/168,966

(22) Filed: Jan. 30, 2014

(65) Prior Publication Data
US 2014/0313236 A1 Oct. 23, 2014

(30) Foreign Application Priority Data
Apr. 22, 2013 (KR) .................. 10-2013-0044346

(51) Int. Cl.
*G09G 5/02* (2006.01)
*G06K 9/00* (2006.01)
(Continued)

(52) U.S. Cl.
CPC .............. *G09G 5/02* (2013.01); *G06K 9/00456* (2013.01); *G09G 3/3648* (2013.01); *G09G 5/00* (2013.01);
(Continued)

(58) Field of Classification Search
CPC .............. G09G 5/00; G09G 5/02; G09G 5/18; G09G 3/3648; G09G 2310/08; G09G 2320/0247; G09G 2320/10; G09G 2320/103; G09G 2330/021; G09G 2340/0435; G09G 2360/16; G06K 9/00456
See application file for complete search history.

(56) References Cited

U.S. PATENT DOCUMENTS 6,329,973 B1 * 12/2001 Akimoto ................. G06F 3/147
345/90
7,151,519 B2 12/2006 Lee
(Continued)

FOREIGN PATENT DOCUMENTS

EP        1 239 448 A2     9/2002
JP      2000-330542 A     11/2000
(Continued)

OTHER PUBLICATIONS

Partial European Search Report dated Sep. 19, 2014 for European Patent Application No. EP 14 159 429.1 which shares priority of Korean Patent Application No. KR 10-2013-0044346 with captioned U.S. Appl. No. 14/168,966.
(Continued)

*Primary Examiner* — Tom Sheng
(74) *Attorney, Agent, or Firm* — Knobbe, Martens, Olson & Bear LLP

(57) ABSTRACT

A display device configured to consume less power is disclosed. In one aspect, the display device includes a display panel comprising a pixel connected to a gate line and a data line, a data driver connected to the data line to apply a data voltage, and a gate driver connected to the gate line to sequentially apply a gate-on voltage. The display device additionally includes a signal controller configured to determine image data as corresponding to one of a motion picture, a still image, and a text screen. Furthermore, the signal controller is configured to drive the display panel, the data driver, and the gate driver at one of a motion picture frequency for displaying the motion picture, a still image frequency lower than the motion picture frequency for displaying the still image, and an ultra-low frequency of about 10 Hz or less for displaying the text screen.

21 Claims, 16 Drawing Sheets

(51) Int. Cl.
*G09G 3/36* (2006.01)
*G09G 5/00* (2006.01)

(52) U.S. Cl.
CPC .. *G09G 2320/0247* (2013.01); *G09G 2320/10* (2013.01); *G09G 2320/103* (2013.01); *G09G 2330/021* (2013.01); *G09G 2340/0435* (2013.01); *G09G 2360/16* (2013.01)

(56) References Cited

U.S. PATENT DOCUMENTS

| | | | |
|---|---|---|---|
| 8,233,713 B2 | 7/2012 | Chien et al. | |
| 9,019,189 B2* | 4/2015 | Choi | G09G 3/20 345/99 |
| 2006/0239550 A1 | 10/2006 | Pulsifer | |
| 2008/0079739 A1 | 4/2008 | Gupta et al. | |
| 2008/0136752 A1* | 6/2008 | Inoue | G09G 3/2022 345/77 |
| 2008/0284719 A1* | 11/2008 | Yoshida | G02F 1/136277 345/102 |
| 2010/0134535 A1 | 6/2010 | Shidara et al. | |
| 2010/0192106 A1* | 7/2010 | Watanabe | G09G 5/14 715/838 |
| 2010/0214328 A1* | 8/2010 | Hara | G09G 3/2025 345/690 |
| 2010/0220927 A1 | 9/2010 | Kim et al. | |
| 2011/0175859 A1 | 7/2011 | Jang et al. | |
| 2011/0299598 A1* | 12/2011 | Sezaki | H04N 7/014 375/240.16 |
| 2012/0169954 A1 | 7/2012 | Liu | |
| 2012/0229443 A1* | 9/2012 | Liu | G09G 3/3611 345/212 |
| 2013/0038621 A1* | 2/2013 | Choi | G09G 3/2092 345/589 |
| 2013/0106895 A1* | 5/2013 | Jeong | G09G 3/3648 345/589 |
| 2013/0113811 A1* | 5/2013 | Choi | G09G 3/3648 345/520 |
| 2013/0155036 A1* | 6/2013 | Kim | G09G 3/2092 345/204 |
| 2015/0103104 A1* | 4/2015 | Lee | G09G 3/3648 345/690 |

FOREIGN PATENT DOCUMENTS

| | | |
|---|---|---|
| JP | 3361705 B2 | 10/2002 |
| JP | 2008-107653 A | 5/2008 |
| KR | 10-2004-0102918 A | 12/2004 |
| KR | 10-2006-0018393 A | 3/2006 |
| KR | 10-2008-0110232 A | 12/2008 |
| KR | 10-2011-0071384 A | 6/2011 |
| WO | WO 2011/099376 A1 | 8/2011 |

OTHER PUBLICATIONS

Watson, Andrew B., "High Frame Rates and Human Vision: A View Through the Window of Visibility," *SMPTE Mot. Imag. J* 2013, 122:18-32. doi: 10.5594/j8266.

Extended European Search Report dated Jan. 13, 2015 for European Patent Application No. EP 14 159 429.1 which shares priority of Korean Patent Application No. KR 10-2013-0044346 with captioned U.S. Appl. No. 14/168,966.

* cited by examiner

DISPLAY DEVICE AND DRIVING METHOD THEREOF

CROSS-REFERENCE TO RELATED APPLICATION

This application claims priority to and the benefit of Korean Patent Application No. 10-2013-0044346 filed in the Korean Intellectual Property Office on Apr. 22, 2013, the entire contents of which are incorporated herein by reference.

BACKGROUND

Field

The disclosed technology generally relates to a display device, and more particularly, to a display device configured to consume less power Description of the Related Technology Display devices constitute an integral part of many devices, including computer monitors, televisions, mobile phones, and the like. Categories of display devices include cathode ray tube displays, liquid crystal displays (LCD), plasma display devices, organic light emitting diode displays (OLED), and active matrix organic light emitting diode displays (AMOLED), among others.

Generally, a display device includes a display panel and a signal controller. The signal controller generates control signals for driving the display panel together with an image signal received from the outside and transfers the generated control signal to the display panel to drive the display device.

Generally, images can be classified into still images and motion pictures based on whether a plurality of frames of the image that can be displayed per second includes the same image information or different image information. For example, the displayed image is a still image when each frame displays the same image data. In contrast, the displayed image is a motion picture when each frame displays a different image data.

However, in many technologies, the controller does not discriminate between different types of images (e.g., a motion picture versus a still image) with respect to the driving frequencies of the display panel, despite that fact that a still image may be driven at a lower frequency with lower power consumption without substantial degradation in viewer experience. Thus, there is a need for a display device configured consume less power by customizing the driving frequency of the display panel based on the type of the image being displayed.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present invention has been made in an effort to provide a display device and a driving method thereof having advantages of reducing power consumption.

In one aspect, the display device includes a display panel comprising a pixel connected to a gate line and a data line, data driver connected to the data line to apply a data voltage, and a gate driver connected to the gate line to sequentially apply a gate-on voltage. The display device additionally includes a signal controller configured to determine image data as corresponding to one of a motion picture, a still image, and a text screen, Furthermore, the signal controller is configured to drive the display panel, the data driver, and the gate driver at one of a motion picture frequency for displaying the motion picture, a still image frequency lower than the motion picture frequency for displaying the still image, and an ultra-low frequency of about 10 Hz or less for displaying the text screen.

When the motion picture frequency is 60 Hz, the still image frequency may be about 30 Hz to 40 Hz.

The signal controller may receive a PSR signal from the outside to check whether a displayed image corresponds to the motion picture or the still image.

When the displayed screen is a text screen, the signal controller may operate the display panel, the data driver, and the gate driver at the initial low frequency.

The text screen or not may be determined by dividing the data of one frame among the input data into data included in any region among a low gray region, a medium gray region, and a high gray region based on a gray and determining whether a predetermined ratio or more of data are included in the low gray region and the high gray region.

The text screen or not may be determined by determining the number of dominant grays having a specific number or more of data among the input data and determining whether the determined number is a predetermined number or less.

The signal controller may include a driving condition setting unit which determines the text screen or not and selects a driving frequency and a register value.

The driving condition setting unit may include a histogram checking unit determining the text screen or not by dividing the data of one frame among the input data into data included in any region among a low gray region, a medium gray region, and a high gray region based on a gray and determining whether a predetermined ratio or more of data are included in the low gray region and the high gray region; a gray checking unit determining the text screen or not by determining the number of dominant grays having a specific number or more of data among the input data and determining whether the determined number is a predetermined number or less; a combining unit receiving outputs of the histogram checking unit and the gray checking unit and performing an AND operation or an OR operation; a frequency selection unit selecting a driving frequency according to the output of the combining unit; and a register selection unit selecting a register value according to the selected driving frequency.

The driving condition setting unit may include a histogram checking unit determining the text screen or not by dividing the data of one frame among the input data into data included in any region among a low gray region, a medium gray region, and a high gray region based on a gray and determining whether a predetermined ratio or more of data are included in the low gray region and the high gray region; a gray checking unit determining the text screen or not by determining the number of dominant grays having a specific number or more of data among the input data and determining whether the determined number is a predetermined number or less; a combining unit receiving outputs of the histogram checking unit and the gray checking unit and performing an AND operation or an OR operation; a frequency selection unit selecting a driving frequency according to the output of the combining unit and a value of a main gray received from the gray checking unit; and a register selection unit selecting a register value according to the selected driving frequency.

The driving condition setting unit may allow the text screen not to be driven at the ultra-low frequency according to a spatial frequency even though the text screen is displayed.

The driving condition setting unit may include a spatial frequency analyzing unit extracting the spatial frequency; a human eye adaption unit determining contrast ratio sensitivity of a user according to the extracted spatial frequency; a frequency selection unit selecting a driving frequency based on the contrast ratio sensitivity; and a register selection unit selecting a register value according to the selected driving frequency.

The display device may further include a camera, in which the camera may measure a distance between the user and the display device to transfer the measured distance to the spatial frequency analyzing unit of the driving condition setting unit, and the measured distance may be used to determine the spatial frequency in the spatial frequency analyzing unit.

In another aspect, a driving method of a display device comprises receiving image data and determining the image data as corresponding to one of a motion picture, a still image, and a text screen. The method additionally includes selecting a driving frequency for driving the display panel, the data driver, and the gate driver from one of a motion picture frequency for displaying the motion picture, a still image frequency lower than the motion picture frequency for displaying the still image, and an ultra-low frequency of about 10 Hz or less for displaying the text screen. The method further includes selecting a register value according to the selected driving frequency When the motion picture frequency is 60 Hz, the still image frequency may be about 30 Hz to 40 Hz.

In the receiving of the input data, a PSR signal may be received together, and in the analyzing of the input data, the input data may be divided into the motion picture or the still image by the PSR signal.

In the analyzing of the input data, a case where the input data is the text screen may be determined by dividing the data of one frame among the input data into data included in any region among a low gray region, a medium gray region, and a high gray region based on a gray and determining whether a predetermined ratio or more of data are included in the low gray region and the high gray region.

In the analyzing of the input data, a case where the input data is the text screen may be determined by determining the number of dominant grays having a specific number or more of data among the input data and determining whether the determined number is a predetermined number or less.

The driving method of a display device may further include determining contrast ratio sensitivity of a user according to a spatial frequency, in which even in the case of the text screen, the ultra-low frequency of about 10 Hz or less may not be selected as the driving frequency.

The spatial frequency may be determined based on a distance between the user and the display device.

According to the exemplary embodiments of the present invention, although a pattern of image data inputted to a display device is driven at an ultra-low frequency of about 10 Hz or less like a text screen, in the case where there is no problem in image quality, the display device is driven at the ultra-low frequency, and as a result, power consumption of the display device may be reduced. Further, according to an exemplary embodiment, the image data such as the text screen is not driven at the ultra-low frequency according to contrast ratio sensitivity of a user depending on the spatial frequency, and as a result, a flicker may not be recognized by the user.

DETAILED DESCRIPTION OF CERTAIN INVENTIVE EMBODIMENTS

Figure 1:
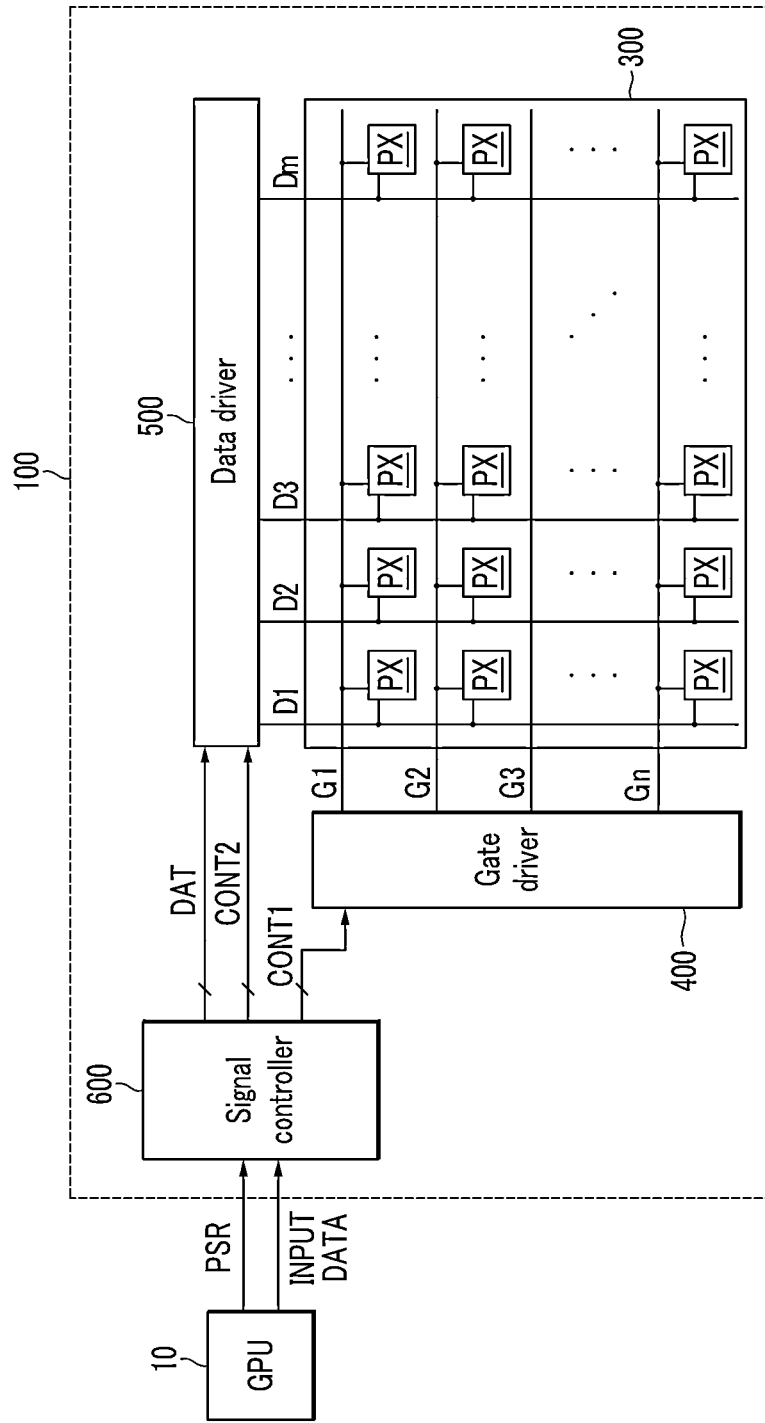
FIG. 1 is a block diagram illustrating a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display device according to an exemplary embodiment of the present invention will be described in detail with reference to FIG. 1.

FIG. 1 is a block diagram illustrating a display device according to an exemplary embodiment.

A display device 100 according to an exemplary embodiment includes a display panel 300 configured to display an image, a data driver 500 configured to drive the display panel 300, a gate driver 400, and a signal controller 600 configured to control the data driver 500 and the gate driver 400, as illustrated in FIG. 1. Further, in FIG. 1, a graphic processing unit (GPU) 10 is connected to the display device 100.

The graphic processing unit 10 provides input data which is data for an image to be displayed in the display device 100, and a panel self-refresh (PSR) signal which is a distinguishing signal capable of distinguishing whether the corresponding image is the still image or the motion picture. Since the PSR signal is the still image, the PSR signal may be a signal which serves to allow the display device 100 to display an image in an existing frame by itself.

The display device 100 receiving the input data and the PSR signal from the graphic processing unit 10 performs an operation of displaying the image, and hereinafter, each portion of the display device 100 will be described in detail.

First, the display panel 300 will be described. Hereinafter, the display panel 300 will be described based on a liquid crystal panel. However, the display panel 300 to which the present invention may be applied may use various display panels such as an organic light emitting display panel, an electrophoretic display panel, a plasma display panel, and the like, in addition to the liquid crystal panel.

The display panel 300 includes a plurality of gate lines G1-Gn and a plurality of data lines D1-Dm. The gate lines G1-Gn extend in a horizontal direction, and the data lines D1-Dm extend in a vertical direction crossing the gate lines G1-Gn.

A pixel is formed at each of the cross junctions of the gate lines G1-Gn and the data lines D1-Dm is a pixel (PX). The pixels PX are arranged in a matrix form, and each pixel PX includes a thin film transistor, a liquid crystal capacitor, and a storage capacitor. A control terminal of the thin film transistor is connected to one of the gate lines G1-Gn, an input terminal of the thin film transistor is connected to one of the data lines D1-Dm, and an output terminal of the thin film transistor is connected to one terminal (pixel electrode) of the liquid crystal capacitor and one terminal of the storage capacitor. The other terminal of the liquid crystal capacitor is connected to a common electrode, and the other terminal of the storage capacitor receives a storage voltage Vcst applied from the signal controller 600. According to an exemplary embodiment, a channel layer of the thin film transistor may be amorphous silicon or polysilicon.

The signal controller 600 responds to the input data inputted from the outside, the PSR signal, and control signals thereof, for example, a vertical synchronization signal Vsync, a horizontal synchronization signal Hsync, a main clock signal MCLK, and a data enable signal DE to process the input data, the PSR signal, and the control signals thereof so as to be suitable for an operation condition of the liquid crystal panel 300, and then generates and outputs image data DAT, a gate control signal CONT1, a data control signal CONT2, and a clock signal.

The gate control signal CONT1 may include a scanning start signal STV instructing output starting of a gate-on voltage Von, a gate clock signal CPV controlling an output time of the gate-on voltage Von, and the like.

The data control signal CONT2 may include a horizontal synchronization start signal STH instructing input starting of the image data DAT, a load signal TP instructing a corresponding data voltage to be applied to the data lines D1-Dm, and the like.

The plurality of gate lines G1-Gn of the display panel 300 is connected with the gate driver 400, and the gate driver 400 alternately applies a gate-on voltage Von and a gate-off voltage Voff to the gate lines G1-Gn according to the gate control signal CONT1 applied from the signal controller 600. The gate-on voltage Von is sequentially applied to each of the gate lines G1-Gn.

The plurality of data lines D1-Dm of the display panel 300 is connected with the data driver 500, and the data driver 500 receives the data control signal CONT2 and the image data DAT from the signal controller 600. The data driver 500 converts an image data DAT into a data voltage by using a gray voltage generated in a gray voltage generator (not illustrated) to transfer the converted data voltage to the data lines D1-Dm.

The display panel 300 may display a still image and a motion picture according to control of the signal controller 600. When a plurality of sequential frames has the same image data, the still image is displayed, and when the plurality of sequential frames has different image data, the motion picture is displayed. The signal controller 600 is configured to display a still image at a still image frequency lower than a motion picture frequency at which the motion picture is displayed. In addition, the signal controller 600 according to an exemplary embodiment is configured to be driven at an ultra-low frequency of about 10 Hz or less, which is lower than the still image frequency, when a set of predetermined criteria are met in addition to the criteria for displaying still images. Here, the predetermined criteria can include, by way of an example, criteria corresponding to images of text screens, e.g., images of pages of books or theses, whose major portions are configured as black and white portions on the display screen. However, according to other exemplary embodiments, the display panel 300 may be driven at the ultra-low frequency even on a screen other than the text screen.

That is, in the display device according to the exemplary embodiment, the display panel 300 is configured to be driven at the motion picture frequency when the motion picture is displayed, driven at the still image frequency when the still image is displayed, and driven at the ultra-low frequency of about 10 Hz or less when a text screen is displayed. Hereinafter, for purposes illustration only, a motion picture frequency refers to a frequency between about 50 Hz and 70 Hz, for instance 60 Hz, and a still image frequency refers to a frequency between about about 30 Hz and 40 Hz.

In the signal controller 600, a driving condition setting unit 601 configured to determine whether the image to be displayed is a text screen or not and to select a driving frequency and various initial register values will be described with reference to FIG. 2.

Figure 2:
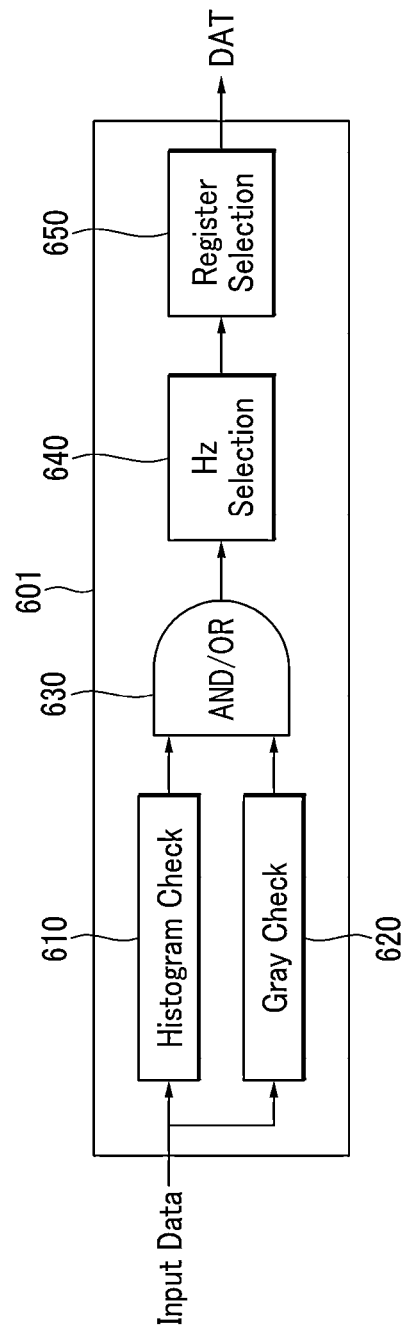
FIG. 2 is a block diagram of a driving condition setting unit of a signal controller according to the exemplary embodiment of the present invention.

FIG. 2 is a block diagram of a driving condition setting unit of a signal controller according to one embodiment.

The signal controller 600 of FIG. 1 is configured to determine whether the display panel 300 will be operates at a still image frequency or a motion picture frequency by categorizing the image to be displayed into a still image or a motion picture based on input data and a PSR signal inputted from an external graphic processing unit 10. In this case, the categorization supplied from the outside is just the division of the motion picture or the still image, but the display device 100 according to the exemplary embodiment of the present invention is driven at the ultra-low frequency of about 10 Hz or less with respect to a screen having the same predetermined requirement as the text screen. Therefore, it is necessary to check whether the screen corresponds to the screen having a predetermined requirement such as the text screen, and it is determined in the driving condition setting unit 601 illustrated in FIG. 2.

In some implementations, the driving condition setting unit 601 is configured to determines a driving frequency at which the display panel 300 is driven and a necessary initial register value. In addition, the process of converting the input data into the image data DAT so as to be transferred to the data driver 500 can be performed by another portion of the signal controller 600 other than the driving condition setting unit 601. In this regard, various exemplary embodiments exist, and it is not separately limited.

Hereinafter, the driving condition setting unit 601 will be described in detail.

The driving condition setting unit 601 selects a driving frequency and an initial register value so that the display panel 300, the data driver 500, and the gate driver 400 operate at the motion picture frequency (e.g., 60 Hz) when input data of the motion picture, that is, different input data from the input data in a previous frame is inputted based on the PSR signal, and as a result, allows the signal controller 600 to control the display panel 300 based on the selected driving frequency and initial register value.

Meanwhile, the driving condition setting unit 601 selects a driving frequency and an initial register value so that the display panel 300, the data driver 500, and the gate driver 400 operate at the still image frequency (for example, at a frequency between about 30 Hz to 40 Hz) when input data of the still image, that is, the same input data as the input data in a previous frame is inputted based on the PSR signal, and as a result, allows the signal controller 600 to control the display panel 300 based on the selected driving frequency and initial register value.

Further, when the input data of the still image corresponds to the predetermined requirement based on the PSR signal (that is, in the case of a text screen), the display device is driven at the ultra-low frequency of about 10 Hz or less which is lower than the still image frequency. Whether or not the image to be displayed is a text screen is determined by the driving condition setting unit 601, and performed through a histogram check and a gray check in the exemplary embodiment of FIG. 2.

The driving condition setting unit 601 may operate whenever the motion picture is inputted or the still image is inputted as the input data, and according to an exemplary embodiment, the driving condition setting unit 601 may operate only in the case where the still image is inputted.

Hereinafter, the driving condition setting unit 601 according to the exemplary embodiment of FIG. 2 will be described in detail.

The driving condition setting unit 601 receives the input data in order to determine whether the input data corresponds to a text screen. The input data inputted to the driving condition setting unit 601 are inputted to a histogram checking unit 610 and a gray checking unit 620, respectively. The driving condition setting unit 601 according to the exemplary embodiment determines whether the input data corresponds to the text screen through the histogram check performed by the histogram checking unit 610 and the gray check performed by the gray checking unit 620. In one embodiment, the input data is determined to be a text screen to be displayed under an ultra-low frequency driving condition through the histogram checking unit 610 and the gray checking unit 620 (AND condition). In another embodiment, the input data is determined to be a text screen through one of the histogram checking unit 610 and the gray checking unit 620 (OR condition).

First, the histogram checking unit 610 will be described.

The histogram checking unit 610 sequentially divides pixels in one frame into a total of three regions (a low gray region, a medium gray region, and a high gray region) based on the gray levels of the pixels and checks whether a predetermined ratio or more of data are included in the low gray region and the high gray region which are both-end regions among the three regions. As such, the case where the predetermined ratio or more of data are included in the low gray region and the high gray region means that a lot of portions displayed by black and white are included and most of the portions displayed on the screen are the text. Further, when boundary values divided into the three regions are controlled, a ratio of data included in the low gray region and the high gray region is changed, and as a result, it may be determined whether the data corresponds to the text screen such as books or theses. As a result determined by using a ratio which belongs to each divided region, in the case of the text screen, since it takes a time for a user to read the corresponding screen and thus the screen is not often changed, although the screen is displayed at the ultra-low frequency of about 10 Hz or less, the screen is refreshed at several times (10 times or less) per second, and as a result, there is no problem in that the user views the screen.

Figure 3:
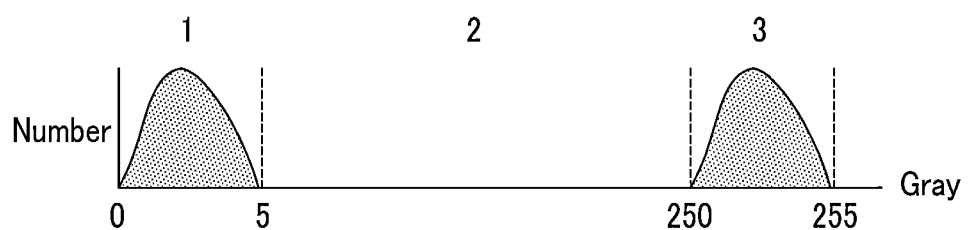
FIGS. 3 and 4 are examples of a histogram check according to the exemplary embodiment of the present invention.
Figure 4:
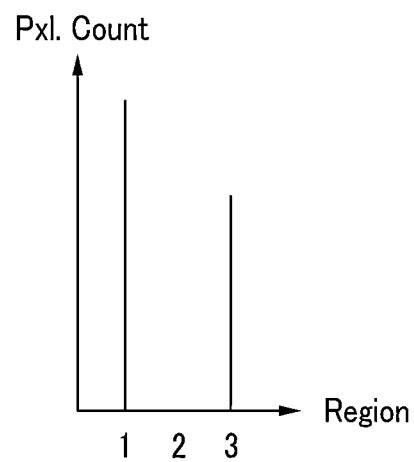

A histogram checking method according to exemplary embodiments are illustrated in FIGS. 3 and 4.

FIGS. 3 and 4 are examples of a histogram check according to the exemplary embodiment of the present invention.

In the illustrated histogram of FIG. 3, pixel data is divided into one of a region 1 (low gray region), a region 2 (medium gray region), and a region 3 (high gray region) based on the gray levels of the pixel.

In the illustrated embodiment of FIG. 3, gray levels 5 and 250 within 256 gray levels (0 to 255 gray) are used as reference values for dividing the low gray region and the high gray region, respectively. The medium gray region includes a wide gray range of gray levels including gray levels 6 to 249, and the range is set in order to more strictly divide whether the input data corresponds to the text screen. However, other embodiments using different gray levels as reference values are possible.

In the histogram of FIG. 3, the image data of pixels in one frame are divided into each gray level and represented by the number. However, if the number of pixels included in each of the three regions (region 1, region 2, and region 3) is desired, the histogram check may be determined as illustrated in FIG. 4. As illustrated in FIG. 4, whether the data corresponds to the text screen is determined based on the number of pixels included in the three regions by performing the histogram check based on a ratio of data which belong to the region 1 and the region 3.

In the exemplary embodiment of FIGS. 3 and 4, since the data are not included in the region 2 which is the medium gray region, it is clear that the region 2 is the text region. However, although some medium grays are included, the data is the signal of the still image on the PSR signal, and as a result, the display device may be driven at the ultra-low frequency in proportion to the text screen. In the exemplary embodiment, when the number of data belonging to the medium gray region is less than 15% of the total number of data in one frame, that is, when the number of data belonging to the low gray region and the high gray region is more than 85% of the total number of data in one frame, it is determined that the data is based on the text screen. However, the value of 85% may be changed according to an exemplary embodiment.

Meanwhile, hereinafter, the gray checking unit 620 will be described.

Referring to FIG. 2, the input data is inputted to the gray checking unit 620. The gray checking unit 620 determines the number of dominant grays having a specific number or more of data among the data in one frame, and recognizes the input data as the text screen when the number is a predetermined number or less.

That is, when various grays (or colors) are not included, but only a few of the grays (or colors) are included in the data of one frame, the data is recognized as the text screen such as books or theses, and as a result, although the text screen is displayed at the ultra-low frequency, there is no problem in image recognition.

Figure 5:
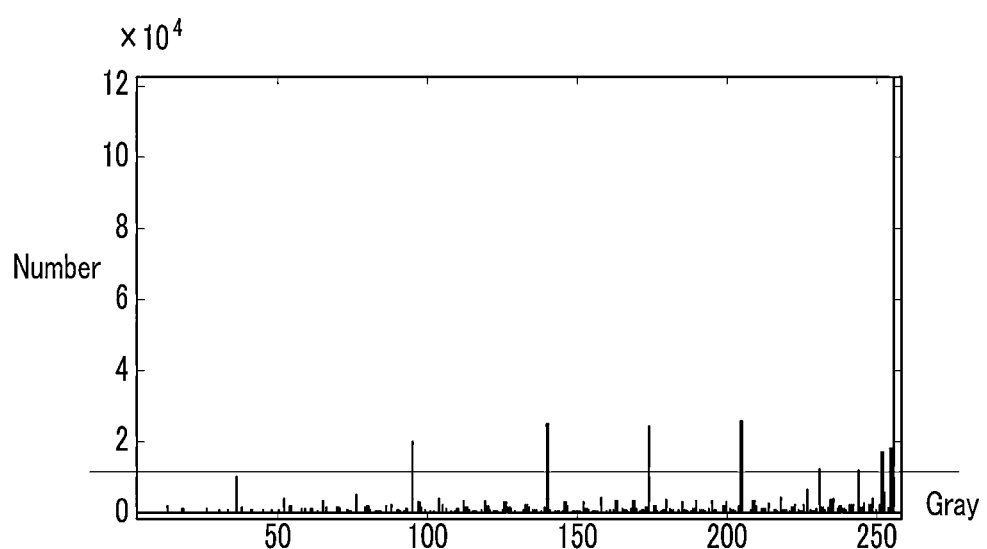
FIG. 5 is an example of a gray check according to the exemplary embodiment of the present invention.

As such, the gray check is illustrated in FIG. 5.

FIG. 5 is an example of a gray check according to another exemplary embodiment.

FIG. 5 is a diagram illustrating the number of corresponding data among data in one frame for each gray as a bar graph.

A horizontal line of FIG. 5 is a line representing a specific number which is a reference for determining the dominant gray or not, and is set, in this example, based on 0.5% among the entire data of one frame. That is, in the exemplary embodiment of FIG. 5, grays corresponding to the specific number (0.5% of the entire data) of more are considered as the dominant grays, and the number thereof is determined.

As such, when the number of determined dominant grays is a predetermined number or less, the data is recognized as the text screen, and in the exemplary embodiment, the predetermined number is set as 10. In the example of FIG. 5, the number of dominant grays having the specific number or more is a total of 8. Therefore, the input data corresponds to the text screen.

The predetermined number and the specific number may be set as various values according to an exemplary embodiment.

Referring back to FIG. 2, outputs of the histogram checking unit 610 and the gray checking unit 620 are transferred to a combining unit 630. The histogram checking unit 610 and the gray checking unit 620 output signals corresponding to whether or not the input data of the frame have been determined to correspond to a text screen, to the combining unit 630.

The combining unit 630 outputs the signal of the text screen when both the output of the histogram checking unit 610 and the output of the gray checking unit 620 are applied as the signals of the text screen, and outputs signals that the outputs are not the text screens in other cases. That is, when the signal of the text screen is 1 and the signal that is not the text screen is 0, an AND operation is performed and the result is outputted. However, according to an exemplary embodiment, an OR operation is performed and the result is outputted. That is, the combining unit 630 may output the signal of the text screen when at least one of the output of the histogram checking unit 610 and the output of the gray checking unit 620 is the signal of the text screen, and output a signal that the output is not the text screen only in other cases.

When the AND operation is performed and the OR operation is performed, the values set in the histogram checking unit 610 and the gray checking unit 620 may be different from each other.

Thereafter, in the case where the output of the combining unit 630 is the signal of the text screen, a frequency selection unit 640 selects an ultra-low frequency of about 10 Hz or less. In the case where the output of the combining unit 630 is the signal that is not the text screen, the frequency selection unit 640 selects a low frequency set as about 30 Hz to 40 Hz.

Thereafter, a register selection unit 650 selects various set values of the display panel 300 according to the selected frequency (ultra-low frequency or low frequency), and the display panel 300 is driven at the corresponding register value. The register value may include an initial register value necessary during driving of the display panel 300.

The driving frequency and the initial register value selected in the frequency selection unit 640 and the register selection unit 650 are used to control the display panel 300, the gate driver 400, and the data driver 500 in the signal controller 600.

According to an exemplary embodiment, the frequency selection unit 640 and the register selection unit 650 may be configured as one block.

Meanwhile, in the PSR signal, even in the case of the motion picture, the input data may pass through a block of FIG. 2. However, since the histogram check and the gray check determine whether the ultra-low frequency driving may be performed, in the case of the motion picture, the display panel 300 may be driven at the motion frequency (e.g., at 60 Hz) without passing through the block of FIG. 2.

Further, in the image data DAT transferred from the signal controller 600 to the data driver 500, the input data is converted and transferred into the image data DAT through a separate route from the driving condition setting unit 601 of FIG. 2.

Figure 6:
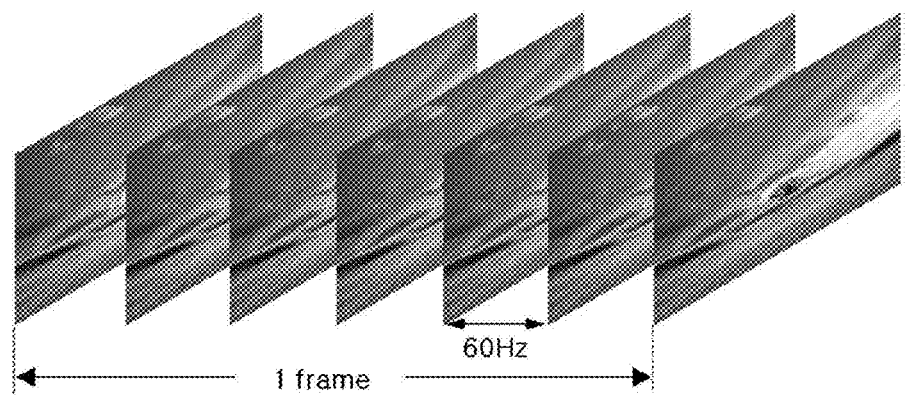
FIGS. 6 to 8 are diagrams schematically illustrating a method of displaying an image in the display device according to the exemplary embodiment of the present invention.
Figure 7:
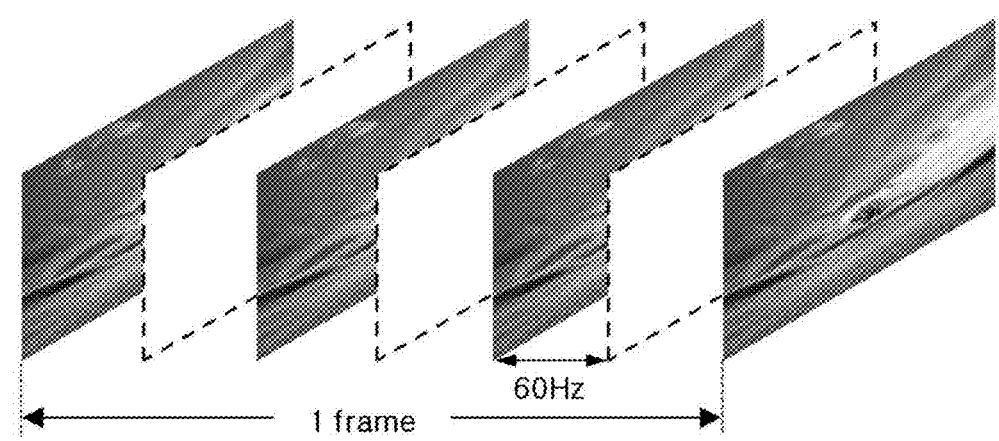
Figure 8:
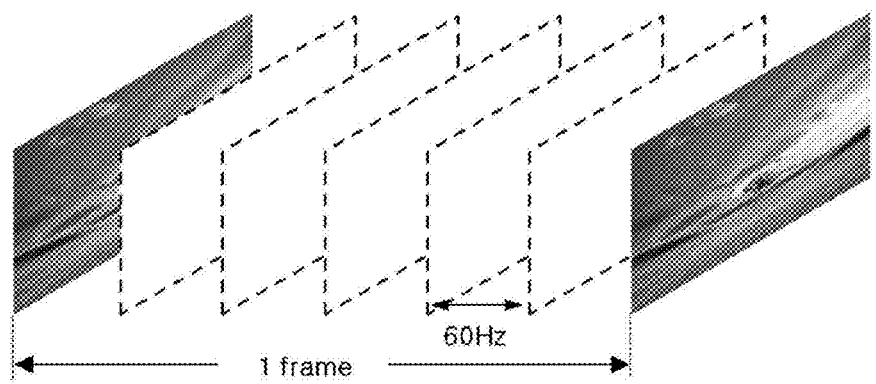

Cases where the display device 100 according to the exemplary embodiment of the present invention displays the motion picture, the still image, and the text screen are compared with each other and illustrated in FIGS. 6 to 8.

FIGS. 6 to 8 are diagrams schematically illustrating a method of displaying an image in the display device according to exemplary embodiments.

First, in FIG. 6, in the case of displaying the motion picture, a method of displaying, for example, 60 frames per one second by being driven at a corresponding motion picture frequency, e.g., 60 Hz, is schematically illustrated. For clarity, only six frames are illustrated.

In contrast, in FIG. 7, in the case of displaying the still image, a method of displaying, for example, 30 frames per one second by being driven at a corresponding still image frequency, e.g., 30 Hz, is schematically illustrated. For clarity, only three frames are illustrated.

Finally, in FIG. 8, in the case of displaying the text screen, a method of displaying, for example, 10 frames per one second by being driven at a corresponding frequency, e.g., 10 Hz, is schematically illustrated. For clarity, only one frame is illustrated.

As illustrated in FIGS. 6 to 8, although the driving frequency is lowered, an unproblematic screen is driven at a low frequency or an ultra-low frequency lower than the low frequency, and as a result, power consumption may be reduced.

Hereinafter, characteristics of the display device according to exemplary embodiments will be described with reference to FIGS. 9 to 12.

Figure 9:
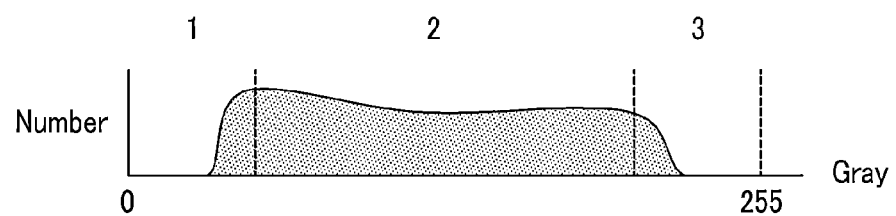
FIGS. 9 to 11 are diagrams illustrating characteristic changes according to a gray in the display device according to the exemplary embodiment of the present invention.
Figure 10:
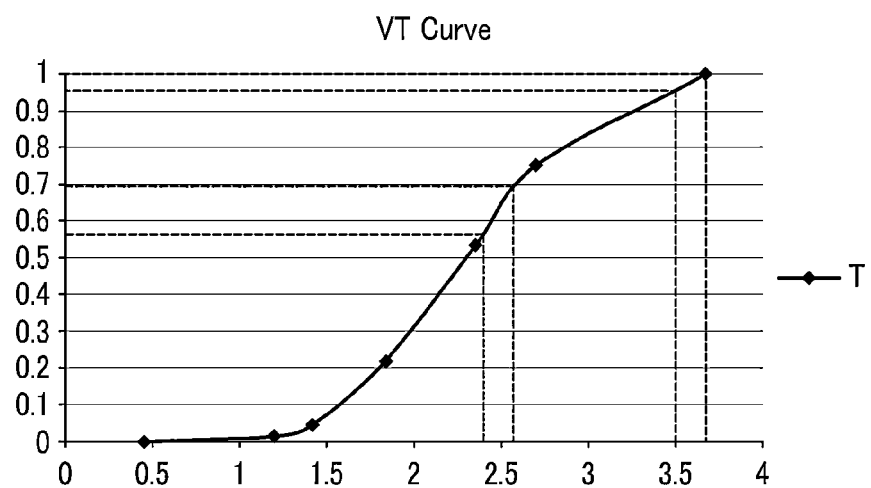
Figure 11:
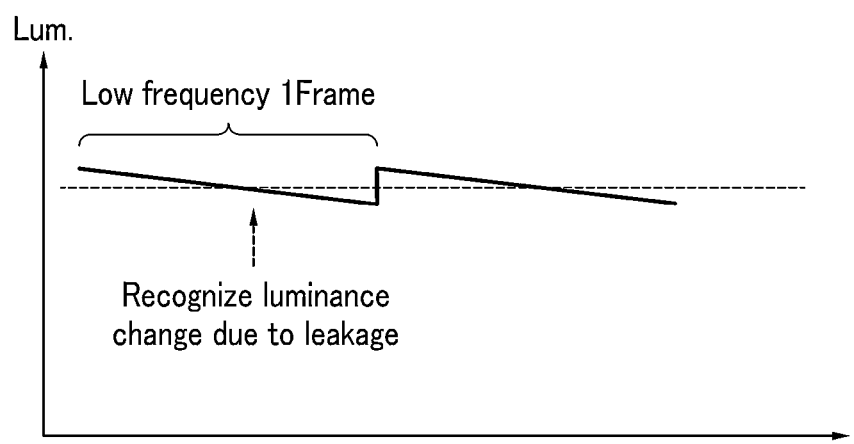
Figure 12:
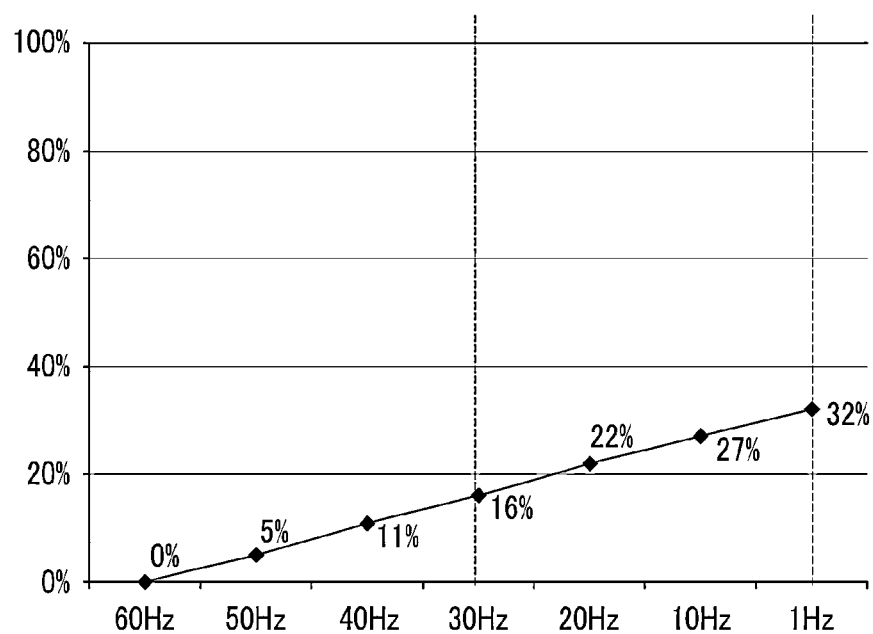
FIG. 12 is a diagram illustrating a reduction ratio of power consumption of the display device according to the exemplary embodiment of the present invention.

FIGS. 9 to 11 are diagrams illustrating characteristic changes according to a gray in the display device according to the exemplary embodiments, and FIG. 12 is a diagram illustrating a reduction ratio of power consumption of the display device according to the exemplary embodiment of the present invention.

First, FIG. 9 is a graph for analyzing data of one frame which are not a text image, for each gray. As illustrated in FIG. 9, all various grays of data are included. As such, although the image data is the still image, a flicker may be recognized due to leakage of data in the medium gray, and as a result, since there is a limit to reduce the still image frequency, the display device is driven at a low frequency of about 30 Hz or higher.

However, in the text screen such as books or theses, since most of gray values are configured by white and black and have high grays and low grays, the leakage of data is small and the flicker is not recognized even at the time of being driven at the ultra-low frequency.

Here, the leakage of data will be described with reference to FIGS. 10 and 11.

First, FIG. 10 is a graph illustrating the transmittance curve as a function of the voltage across a liquid crystal capacitor.

As illustrated in FIG. 10, the relative slopes of the transmittance curve line in mid-voltage regions (corresponding to medium gray levels), compared to low voltage regions (corresponding to low gray levels) or a high voltage regions (corresponding to high gray levels). That is, the relative rate of change in transmittance for a given change in voltage is larger in mid-voltage regions compared to low and high voltage regions.

In general, in a liquid crystal display, the voltage charged in a liquid crystal capacitor is reduced over time due to leakage current. Particularly, in the case of low frequency driving, a leakage time of a voltage charged in one terminal (or a pixel electrode) of the liquid crystal capacitor is increased, and as a result, a voltage change of the pixel electrode is increased. As such, as discussed above, while the voltage change may not be recognized by a viewer in the high gray region or the low gray region because of the relatively small change in luminance for a given change in capacitor voltage, may be recognized by the viewer in the medium gray region because of the relatively large change in luminance change for the given change in capacitor voltage.

In FIG. 11, although the same gray is displayed in the medium gray region, a change in luminance with time is illustrated by a graph.

As illustrated in FIG. 11, luminance is changed in the medium gray region, and the user recognizes the change of luminance as a flicker according to a luminance change.

As a result, in the case where grays of the medium gray region are included even in the still image at a predetermined level or more, the user may recognize the flicker, and as a result, the driving frequency may not be lowered to the ultra-low frequency.

Therefore, as illustrated in FIG. 2, in the exemplary embodiment of the present invention, the text screen having small medium grays or not is determined through the histogram check and the gray check and then, in the case of the text screen, the text screen is driven at the ultra-low frequency.

FIG. 12 illustrates reduction of power consumption of the display device according to the exemplary embodiment of the present invention. In FIG. 12, an x axis is a driving frequency, a y axis is a reduction ratio based on power consumption at the time of being driven at 60 Hz as a reduction ratio of power consumption.

As illustrated in FIG. 12, when reducing the driving frequency from about 60 Hz to 30 Hz, the power consumption is reduced by about 16%. Further, in the case of being driven at about 10 Hz or less, the power consumption is reduced by at least 27%, and in the case of being driven at about 1 Hz or less, the power consumption is reduced by about 32%.

As such, when considering the reduction of power consumption, a notebook or a tablet PC using a battery is used for 10 hours and 22 minutes during full charging, but may be used for 10 hours and 46 minutes by using the ultra-low frequency of the present invention.

Therefore, like the exemplary embodiment of the present invention, when the user recognizes only the text screen in the display device having the battery, the image may be displayed for a longer time as compared with a display device in the related art.

Hereinafter, a driving condition setting unit 601 according to another exemplary embodiment of the present invention will be described with reference to FIG. 13.

Figure 13:
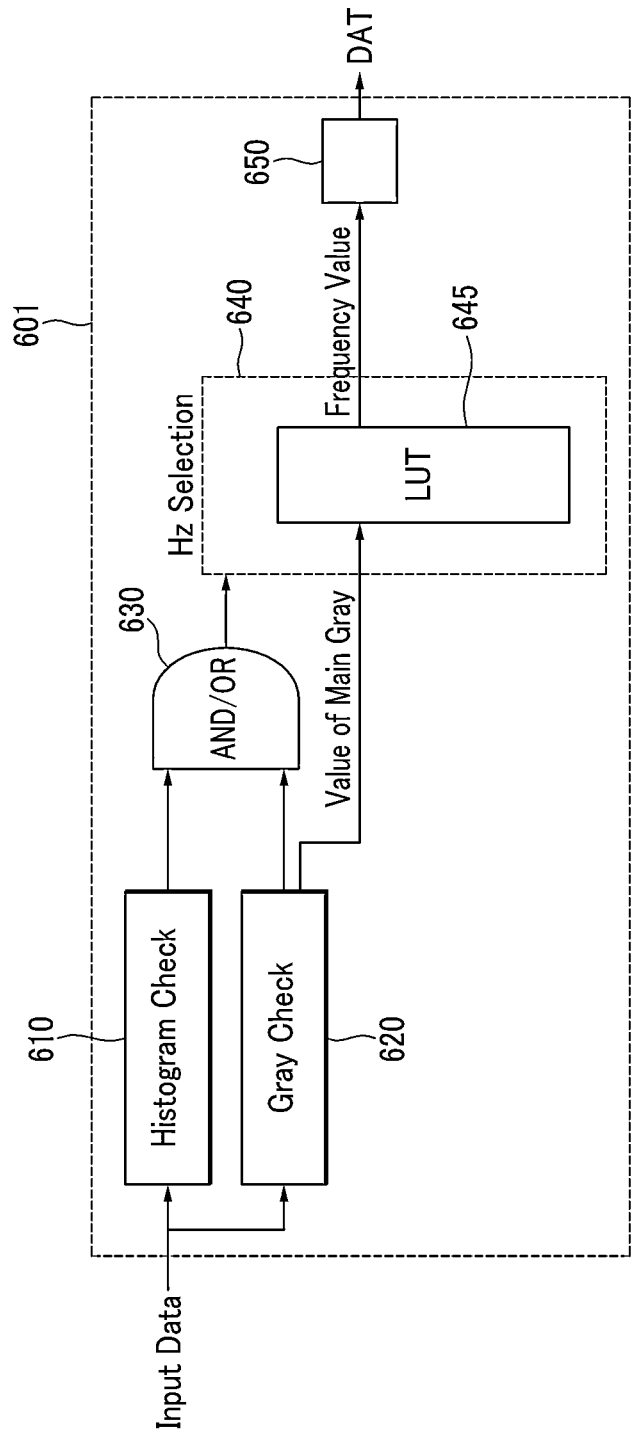
FIG. 13 is a block diagram of a driving condition setting unit of a signal controller according to another exemplary embodiment of the present invention.

FIG. 13 is a block diagram of a driving condition setting unit 601 of a signal controller according to another exemplary embodiment of the present invention.

The exemplary embodiment of FIG. 13 is similar to the exemplary embodiment of FIG. 2, but there is a difference in that the output of the gray checking unit 620 is transferred to the combining unit 630 and directly transferred to the frequency selection unit 640.

That is, FIG. 13 is similar to FIG. 2 in that the display device includes the histogram checking unit 610, the gray checking unit 620, the combining unit 630, the frequency selection unit 640, and the register selection unit 650. However, in FIG. 13, a lookup table 645 is included in the frequency selection unit 640, a dominant gray value is transferred to the lookup table 645 in the gray checking unit 620 to select a driving frequency in the lookup table 645, the selected driving frequency (frequency value) is transferred to the register selection unit 650 to select a register value according to the corresponding driving frequency, and then the display panel 300, the data driver 500, and the gate driver 400 operate.

That is, in the exemplary embodiment of FIG. 13, the display panel 300, the data driver 500, and the gate driver 400 operate at the ultra-low frequency by selecting the ultra-low frequency and selecting a register through a histogram check and a gray check in the case of a text screen like the exemplary embodiment of FIG. 2. Meanwhile, in the case where the data is not the text screen, the display panel 300, the data driver 500, and the gate driver 400 may operate at the low frequency. However, the output of the combining unit 630 provides only information about whether the ultra-low frequency is selected in the frequency selection unit 640, and an actual driving frequency may be selected according to a main gray value. To this end, in FIG. 13, a route which directly outputs a main gray value from the gray checking unit 620 to the frequency selection unit 640 is included. Here, the main gray may be a gray including the most number of data. The route is a route to reduce the power consumption by changing a driving frequency based on a main gray value of the image even in the case where the data of one frame is general image data, not the text screen. Further, in the exemplary embodiment of FIG. 13, since a background of the displayed image is related to the main gray, the display device may be driven at different driving frequencies according to a background.

That is, the gray checking unit 620 determines the number of dominant grays having a specific number or more of data among the data of one frame, recognizes the data as the text screen in the case of a predetermined number or less of data to transfer the text screen to the combining unit 630, and determines a main gray value among the data of one frame to transfer the determined main gray value to the lookup table 645 of the frequency selection unit 640. The main gray value may be a gray which is the most included in the data of one frame.

The driving frequency corresponding to the main gray value is stored in the lookup table 645, and the driving frequency corresponding to the main gray value is found and transferred to the register selection unit 650.

Figure 14:
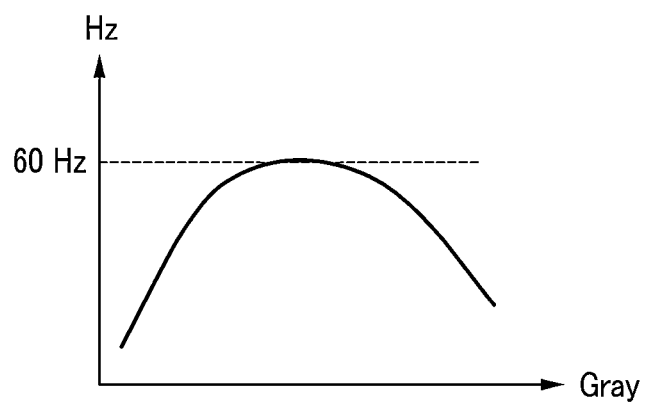
FIG. 14 is a graph illustrating a driving frequency according to a gray in the exemplary embodiment of FIG. 13.

An exemplary embodiment for a relationship between the driving frequency stored in the lookup table 645 and the main gray is schematically illustrated in FIG. 14.

FIG. 14 is an example graph illustrating a driving frequency according to a gray in the exemplary embodiment of FIG. 13.

The graph of FIG. 14 is a graph of an example of a driving frequency value for the main gray value, and the motion picture frequency is a maximum driving frequency value as 60 Hz.

As illustrated in FIG. 14, in the case where a main gray value of general image data is a medium gray, 60 Hz which is the maximum driving frequency or a high frequency corresponding to 60 Hz may be set as the driving frequency. However, the driving frequency has a low value toward the low gray and the high gray.

The reason is that deterioration of display quality is small even though the screen including the high gray and the low gray as the main gray is displayed at a relatively low driving frequency.

A relationship between the main gray value and the driving frequency in the lookup table 645 may have a relationship different from that of FIG. 14.

Hereinafter, an exemplary embodiment which is different from the driving frequency of the display device according to a spatial frequency will be described.

First, a spatial frequency will be described in FIG. 15.

Figure 15:
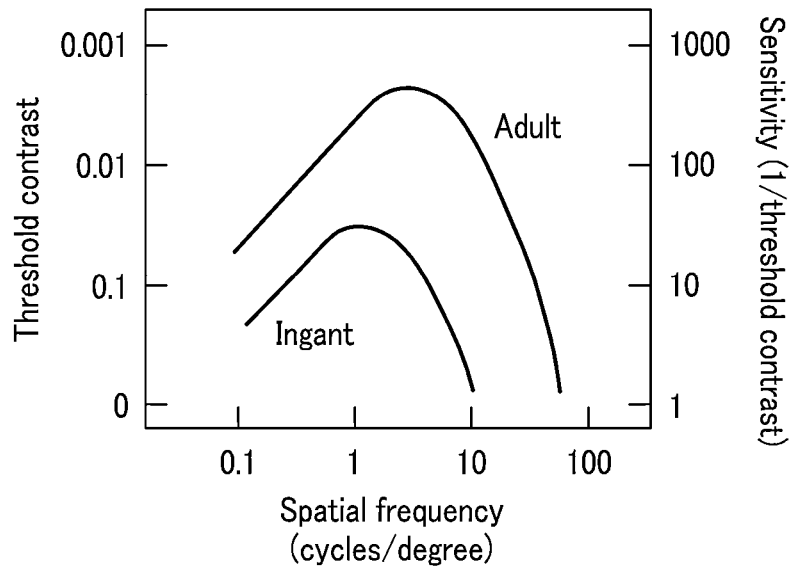
FIG. 15 is a graph illustrating a display characteristic according to a spatial frequency.

FIG. 15 is a graph illustrating a display characteristic according to a spatial frequency.

FIG. 15 is a graph illustrating a degree of recognizing a contrast ratio by a person according to a spatial frequency. A spatial frequency generally refers to the characteristic of a structure to repeat itself per unit of space. Without being bound to theory, in one aspect, human perception of a feature can include a mathematical summation of a plurality of sub-features, each having a sinusoidal spatial frequency. Because humans perceive the mathematical summation, the summed feature is perceived as being "smooth," without having distinguishable sinusoidal periodicities of the sub-features. The spatial frequency in human perception can be expressed in the number of cycles per degree of visual angle. In addition, FIG. 15 illustrates that an adult and a child can have different sensitivities to different spatial frequencies.

In the case of the adult, the contrast ratio is best recognized in a spatial frequency of 3 cycles/degree. Here, the spatial frequency of 3 cycles/degree means a change in pixel value having 3 cycles in a viewing angle.

As such, in a region where the contrast ratio is recognized well, in the case of being driven at the low frequency, the flicker may be more easily recognized. Therefore, to minimize the perceived flickering, the display device can be driven at a low frequency or an ultra-low frequency where the human sensitivity to spatial frequency is low, and driven at a general driving frequency where the human sensitivity to spatial frequency is high.

That is, in the exemplary embodiment, the spatial frequency is analyzed in an image driven at the low frequency or the ultra-low frequency and then only when the user does not recognize the flicker well, the display device is driven at the low frequency or the ultra-low frequency, and when the user recognizes the flicker well, the driving at the low frequency or the ultra-low frequency is limited.

Figure 16:
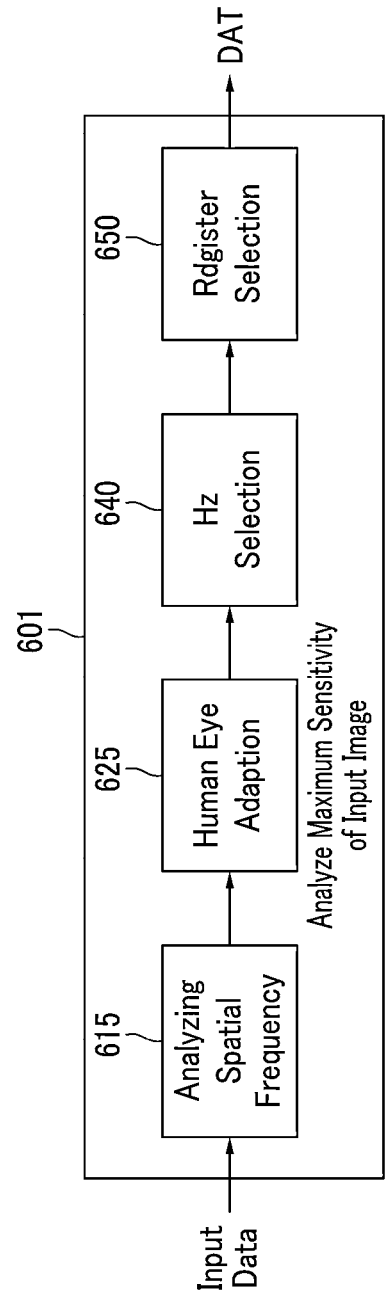
FIG. 16 is a block diagram of a driving condition setting unit of a signal controller according to another exemplary embodiment of the present invention.

As such, the driving condition setting unit 601 of the signal controller 600 considering the spatial frequency is illustrated in FIG. 16.

FIG. 16 is a block diagram of a driving condition setting unit 601 of a signal controller according to another exemplary embodiment of the present invention.

The driving condition setting unit 601 of the signal controller 600 includes a spatial frequency analyzing unit 615, a human eye adaption unit 625, a frequency selection unit 640, and a register selection unit 650.

The spatial frequency analyzing unit 615 estimates a distance between the display device and the user based on an image displayed by the display device or a user environment to extract a spatial frequency based thereon.

The extracted spatial frequency value is transferred to the human eye adaption unit 625, and in a graph of FIG. 15, contrast ratio sensitivity of a person according to a spatial frequency of an average age of person using the display device is determined.

The determined contrast ratio sensitivity is transferred to the frequency selection unit 640, and when the determined contrast ratio sensitivity is a predetermined level or more, the ultra-low frequency is not selected as the driving frequency, and when the determined contrast ratio sensitivity is less than the predetermined level, the ultra-low frequency is selected as the driving frequency and driven.

Further, the register selection unit 650 selects an initial value according to the selected driving frequency, and the display panel 300 operates.

In the case where the determined contrast ratio sensitivity is the predetermined level or more, possibility that the user recognizes the flicker is high and thus the display panel 300 is not driven at the ultra-low frequency, and when the determined contrast ratio sensitivity is less than the predetermined level, the ultra-low frequency is selected as the driving frequency and driven.

The exemplary embodiment of FIG. 16 may be applied together with the exemplary embodiment determining the image data like the exemplary embodiment of FIG. 2 or FIG. 13. That is, like the exemplary embodiment of FIG. 2 or FIG. 13, although it is determined that the display device may be driven at an ultra-low frequency by determining the image data, in the case where the contrast ratio sensitivity determined according to the exemplary embodiment of FIG. 16 is the predetermined level or more, the display device may be controlled not to be driven at the ultra-low frequency.

Meanwhile, the spatial frequency analyzing unit 615 analyzes a spatial frequency based on the distance value between the display device and the user, and to this end, the display device 100 may further include a camera 110 determining a distance from the display device to the user.

This will be described in FIGS. 17 and 18.

Figure 17:
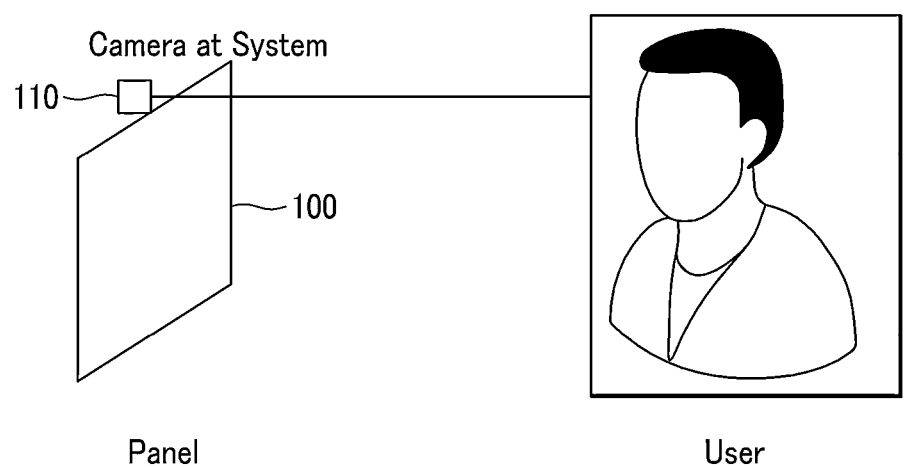
FIG. 17 is a block diagram illustrating a display device according to another exemplary embodiment of the present invention.
Figure 18:
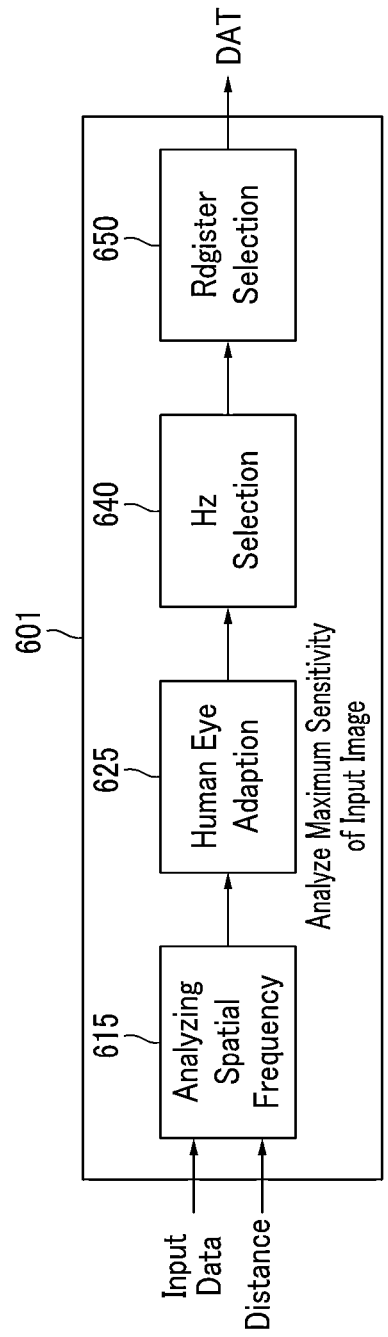
FIG. 18 is a block diagram of a driving condition setting unit of a signal controller according to the exemplary embodiment of FIG. 17.

FIG. 17 is a block diagram of a display device according to another exemplary embodiment, and FIG. 18 is a block diagram of a driving condition setting unit 601 of a signal controller according to the exemplary embodiment of FIG. 17.

In FIG. 17, a structure including the camera 110 in order to determine the distance between the user and the display device 100 is illustrated.

Further, in FIG. 18, in the data inputted to the driving condition setting unit 601 of the signal controller 600, a distance value to the user is inputted together with the input data.

The inputted distance value to the user is inputted to the spatial frequency analyzing unit 615 to calculate the spatial frequency based on the distance value.

The following structure is the same as that of FIG. 16.

Since the exemplary embodiment of FIGS. 17 and 18 more clearly determines the spatial frequency according to a position of the user, when the display device is driven at the ultra-low frequency of about 10 Hz of less, the flicker is not recognized regardless of the position of the user.

Hereinafter, a driving method of a display device according to an exemplary embodiment of the present invention will be described with reference to FIG. 19.

Figure 19:
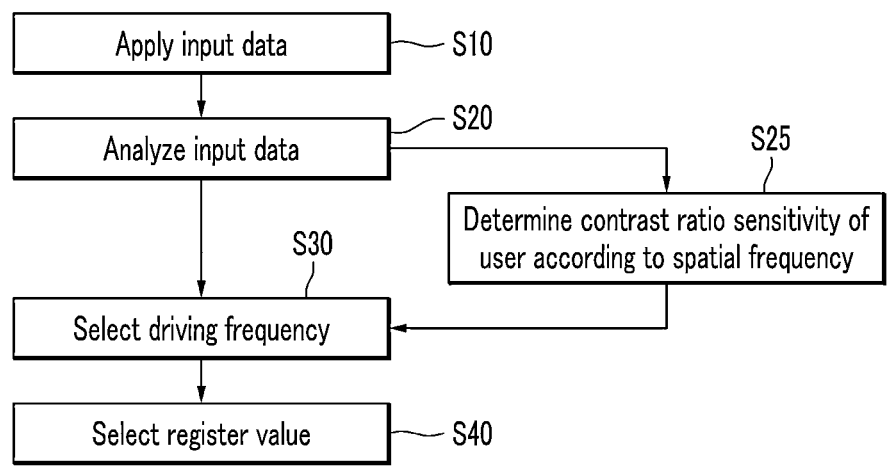
FIG. 19 is a flowchart of a driving method of a display device according to an exemplary embodiment of the present invention.

FIG. 19 is a flowchart of a driving method of a display device according to an exemplary embodiment.

At a process state S10, input data is applied to the signal controller 600 of the display device 100 from the graphic processing unit 10 positioned at the outside of the display device. In this case, a PSR signal may be applied together.

The applied input data at the state S10 is subsequently analyzed at a process state S20 in the condition setting unit 601 of the signal controller 600, and divided into categories including a motion picture, a still image, or a text screen. Here, the categorization as a text screen may be performed through a histogram check or a gray check as illustrated in FIG. 2 or 13. Further, whether the image to be displayed is a motion picture or a still image may be determined by the PSR signal.

The driving frequency is selected at a process state S30 according to the type of the image to be displayed as categorized at the state S20. That is, in the case where the input data is categorized as a motion picture, a motion frequency (e.g., about 60 Hz) is selected as the driving frequency, and in the case where the input data is categorized as a still image, a still image frequency of about 30 Hz to 40 Hz lower than the motion picture frequency is selected as the driving frequency. Furthermore, in the case where the input data is categorized as a text screen, an ultra-low frequency of about 10 Hz or less is selected as the driving frequency.

Thereafter, at a process state S40, a register value is selected according to the selected driving frequency (S40).

The display device according to one exemplary embodiment may be driven according to the above order.

However, the spatial frequency may be additionally considered in selecting the driving frequency according to another exemplary embodiment. That is, at a process step S25, a contrast ratio sensitivity of the user may be determined according to the spatial frequency. In selecting the driving frequency at the state S30, even in some instances where the image to be displayed is a text screen, the ultra-low frequency of about 10 Hz or less may not be selected as the driving frequency according to the determined contrast ratio sensitivity. That is, when the determined contrast ratio sensitivity is a predetermined level or more, the ultra-low frequency is not selected as the driving frequency, and when the determined contrast ratio sensitivity is less than the predetermined level, the ultra-low frequency is selected as the driving frequency and driven, and as a result, the user may not recognize the flicker.

In the flowchart of FIG. 19, the analyzing of the text screen (S20) and the determining of the spatial frequency (S25) are included together. However, the determining of the spatial frequency (S25) may be omitted.

Hereinabove, the exemplary embodiments using the motion picture frequency of 60 Hz and the still image frequency of about 30 Hz to 40 Hz are mainly described. However, the motion picture frequency may perform high-speed driving like 120 Hz and 240 Hz, and the still image frequency may have a value of a half to ⅔ of the motion picture frequency.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a display panel comprising a pixel connected to a gate line and a data line;
a data driver connected to the data line to apply a data voltage;
a gate driver connected to the gate line to sequentially apply a gate-on voltage; and
a signal controller configured to determine image data as corresponding to one of a motion picture and a text screen,
wherein the signal controller is further configured to drive the display panel, the data driver, and the gate driver at one of a motion picture frequency for displaying the motion picture and an ultra-low frequency lower than the motion picture frequency for displaying the text screen,
wherein the signal controller is configured to make a determination of whether or not the image data corresponds to the text screen based on a combination of a determination of whether a ratio of a number of pixels within a low gray region and a high gray region to a total number of pixels exceeds a predetermined ratio, and a determination of whether a number of dominant gray levels exceeds a predetermined number, wherein a percentage of pixels having each dominant gray level is greater than a predetermined percentage of the total number of pixels.

2. The display device of claim 1, wherein:
the motion picture frequency is about 60 Hz, and wherein the ultra-low image frequency is about 10 Hz or less.

3. The display device of claim 2, wherein:
the signal controller is configured to receive an externally generated panel self-refresh (PSR) signal to determine whether the image data corresponds one of the motion picture and a still image.

4. The display device of claim 3, wherein:
the signal controller is further configured to determine whether the image data corresponds to the text screen or not by dividing pixels of one frame of the image data into one of the low gray region, a medium gray region, and the high gray region based on gray levels of the pixels, and determining whether the ratio exceeds the predetermined ratio.

5. The display device of claim 3, wherein:
the signal controller is further configured to determine whether the image data corresponds to the text screen or not by determining whether a number of pixels having the dominant gray levels within the pixels of one frame exceeds a predetermined number.

6. The display device of claim 3, wherein:
the signal controller comprises a driving condition setting unit configured to determine whether the image data corresponds to the text screen or not and configured to select a driving frequency and a register value.

7. The display device of claim 6, wherein:
the driving condition setting unit comprises:
a histogram checking unit configured to determine whether the image data corresponds to the text screen or not by dividing pixels of one frame of the image data into one of a low gray region, a medium gray region, and a high gray region based on gray levels of the pixels, and determining whether a ratio of a number of pixels within the low gray region and the high gray region to a total number of pixels exceeds a predetermined ratio;
a gray checking unit configured to determine whether the image data corresponds to the text screen or not by determining whether a number of pixels having the dominant gray levels within the pixels of one frame exceeds a predetermined number;
a combining unit configured to receive outputs of the histogram checking unit and the gray checking unit and performing one of an AND operation and an OR operation;
a frequency selection unit configured to select a driving frequency according to the output of the combining unit; and
a register selection unit configured to select a register value according to the selected driving frequency.

8. The display device of claim 6, wherein:
the driving condition setting unit comprises:
a histogram checking unit configured to determine whether the image data corresponds to the text screen or not by dividing pixels of one frame of the image data into one of a low gray region, a medium gray region, and a high gray region based on gray levels of the pixels, and determining whether a ratio of a number of pixels within the low gray region and the high gray region to a total number of pixels exceeds a predetermined ratio;
a gray checking unit configured to determine whether the image data corresponds to the text screen or not by determining whether a number of pixels having the dominant gray levels within the pixels of one frame exceeds a predetermined number;
a combining unit configured to receive outputs of the histogram checking unit and the gray checking unit and performing one of an AND operation and an OR operation;
a frequency selection unit configured to select a driving frequency according to the output of the combining unit and a value of a main gray level received from the gray checking unit; and
a register selection unit configured to select a register value according to the selected driving frequency.

9. The display device of claim 6, wherein:
the driving condition setting unit allows the text screen not to be driven at the ultra-low frequency according to a spatial frequency although the text screen is displayed.

10. The display device of claim 9, wherein:
the driving condition setting unit comprises:
a spatial frequency analyzing unit configured to extract a spatial frequency;
a human eye adaption unit configured to determine a contrast ratio sensitivity of a user according to the extracted spatial frequency;
a frequency selection unit configured to select a driving frequency based on the contrast ratio sensitivity; and
a register selection unit configured to select a register value according to the selected driving frequency.

11. The display device of claim 10, further comprising:
a camera configured to measure a distance between a user and the display device and to transfer the measured distance to the spatial frequency analyzing unit of the driving condition setting unit, wherein
the measured distance is used to determine the spatial frequency in the spatial frequency analyzing unit.

12. A display device, comprising:
a display panel comprising a pixel connected to a gate line and a data line;
a data driver connected to the data line to apply a data voltage;
a gate driver connected to the gate line to sequentially apply a gate-on voltage; and
a signal controller configured to determine image data as corresponding to one of a motion picture and a text screen,
wherein the signal controller is further configured to drive the display panel, the data driver, and the gate driver at one of a motion picture frequency for displaying the motion picture and an ultra-low frequency lower than the motion picture frequency for displaying the text screen,
wherein the signal controller comprises a driving condition setting unit,
wherein the driving condition setting unit comprises:
a spatial frequency analyzing unit configured to extract a spatial frequency;
a human eye adaption unit configured to determine a contrast ratio sensitivity of a user according to the extracted spatial frequency;
a frequency selection unit configured to select a driving frequency based on the contrast ratio sensitivity; and
a register selection unit configured to select a register value according to the selected driving frequency.

13. The display device of claim 12, further comprising:
a camera
configured to measure a distance between a user and the display device and to transfer the measured distance to the spatial frequency analyzing unit of the driving condition setting unit, wherein
the measured distance is used to determine the spatial frequency in the spatial frequency analyzing unit.

14. A driving method of a display device, comprising;
receiving image data;
determining the image data as corresponding to one of a motion picture and a text screen;
selecting a driving frequency for driving the display panel, the data driver, and the gate driver from one of a motion picture frequency for displaying the motion picture and an ultra-low frequency lower than the motion picture frequency for displaying the text screen; and
selecting a register value according to the selected driving frequency,
wherein determining whether or not the image data corresponds to the text screen includes a combination of determining whether a ratio of a number of pixels within a low gray region and a high gray region to a total number of pixels exceeds a predetermined ratio, and determining whether a number of dominant gray levels exceeds a predetermined number, wherein a percentage of pixels having each dominant gray level is greater than a predetermined percentage of the total number of pixels.

15. The driving method of a display device of claim 14, wherein:
the motion picture frequency is about 60 Hz, and wherein the ultra-low frequency is about 10 Hz or less.

16. The driving method of a display device of claim 15, wherein:
receiving of the image data includes receiving a panel self-refresh (PSR) signal, and
determining the input image data includes determining whether the image data corresponds to the motion picture or a still image based on the PSR signal.

17. The driving method of a display device of claim 15, wherein:
determining the image data to be the text screen, includes dividing pixels of one frame of the image data into one of the low gray region, a medium gray region, and the high gray region, and determining whether the ratio exceeds the predetermined ratio.

18. The driving method of a display device of claim 17, wherein:
determining the image data to be the text screen includes determining whether a number of pixels having the dominant gray levels within the pixels of one frame exceeds a predetermined number.

19. The driving method of a display device of claim 15, wherein:
determining the image data to be the text screen includes determining whether a number of pixels having the dominant gray levels exceeds a predetermined number.

20. The driving method of a display device of claim 15, further comprising:
determining contrast ratio sensitivity of a user according to a spatial frequency,
wherein upon determining the image data to be the text screen, the ultra-low frequency of about 10 Hz or less is not selected as the driving frequency for according to the determined contrast ratio sensitivity.

21. The driving method of a display device of claim 20, wherein:
the spatial frequency is determined based on a distance between a user and the display device.

* * * * *